(No Model.) 2 Sheets—Sheet 1.

A. B. HUTCHINS.
GAS STOVE.

No. 527,858. Patented Oct. 23, 1894.

WITNESSES:

INVENTOR
Abner B Hutchins,
BY Briesen & Knauth
ATTORNEYS.

(No Model.) 2 Sheets—Sheet 2.

A. B. HUTCHINS.
GAS STOVE.

No. 527,858. Patented Oct. 23, 1894.

WITNESSES:

INVENTOR
Abner B Hutchins,
BY Briesen & Knauth
ATTORNEYS.

UNITED STATES PATENT OFFICE.

ABNER B. HUTCHINS, OF NEW YORK, N. Y., ASSIGNOR TO LUTHER & LEDERHOS, OF SAME PLACE.

GAS-STOVE.

SPECIFICATION forming part of Letters Patent No. 527,858, dated October 23, 1894.

Application filed September 26, 1893. Serial No. 486,516. (No model.)

*To all whom it may concern:*

Be it known that I, ABNER B. HUTCHINS, a resident of the city, county, and State of New York, have invented a new and useful Improvement in Gas-Stoves, of which the following is a specification.

My invention relates to gas stoves and has for its object to produce a stove which will form an efficient heater, and to this end my invention consists in a sectional perforated casing of pyramidal or conical form closely surrounding a distributing block or chamber conforming in shape thereto and elevated above the floor thereof, and in further details of construction herein set forth and more particularly pointed out in the claims.

Figure 1:
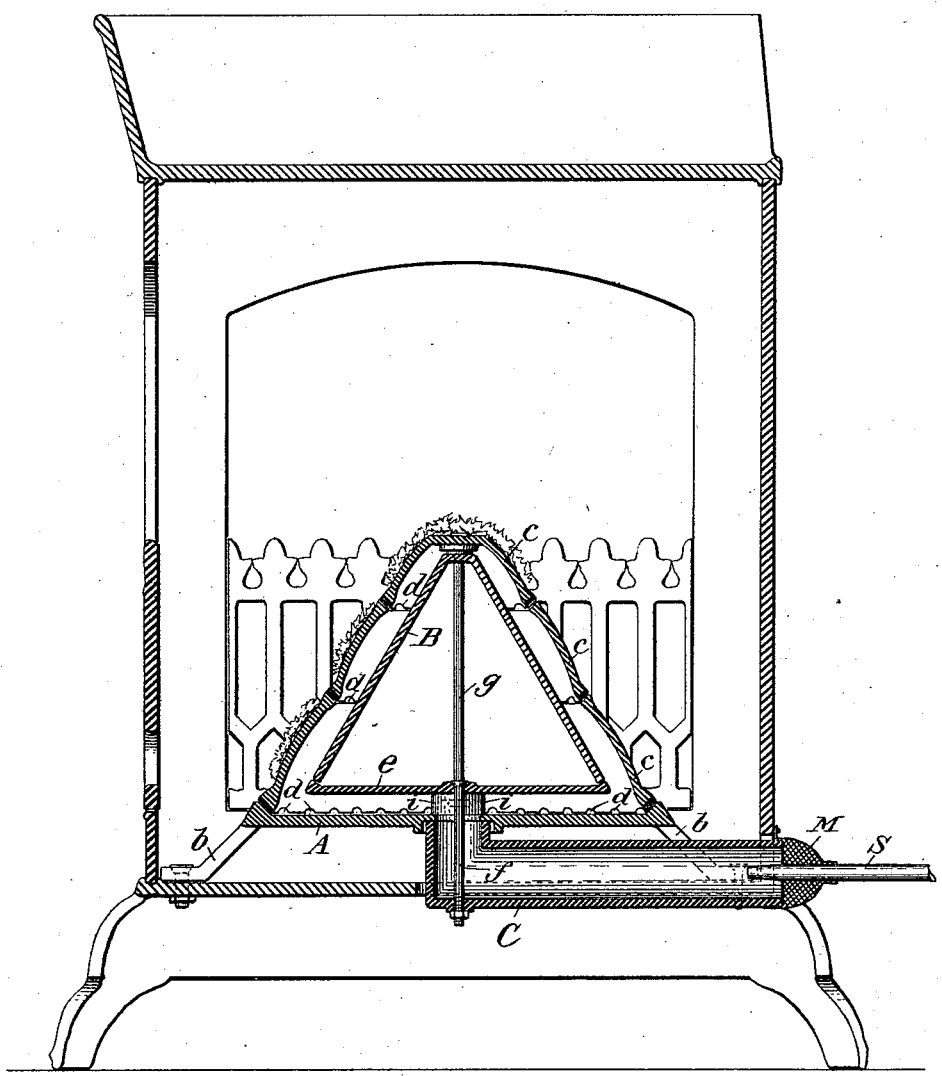
Figure 2:
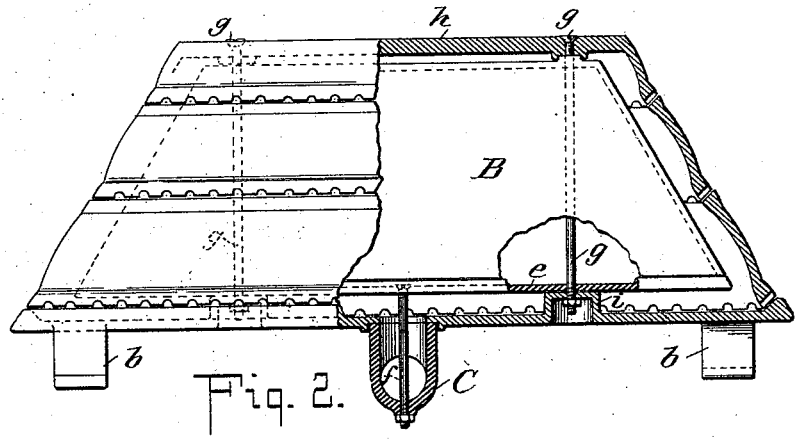
Figures 3, 4:
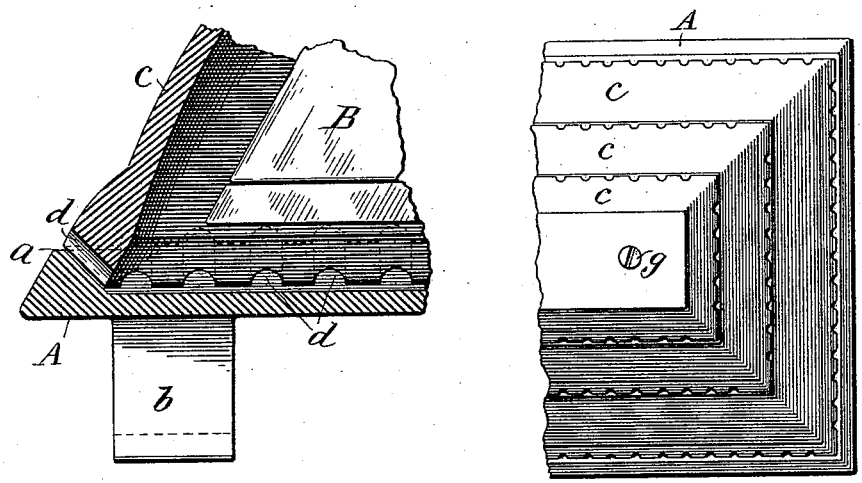

In the drawings—Figure 1 is a sectional view of a gas stove embodying my invention. Fig. 2 is a detail view of the burner, partly broken away and in section. Fig. 3 is a top view of a part thereof. Fig. 4 is an enlarged broken away sectional view of a detail to be hereinafter described.

A base plate A having a projecting rim $a$ and lugs or feet $b$ supports a pyramidal chamber or block B, which serves as a distributer for the air and gas mixture supplied for burning. Closely surrounding this distributing device B is a casing or mantle conforming to the shape of the distributer consisting of tiers of superposed caps $c$, of which the lowest rests on the base plate within the rim $a$ thereof. These caps $c$ are suitably pierced preferably at their abutting edges with rows of burner holes $d$ $d$ which extend entirely around the mantle or casing. The space within this casing is filled by the distributer B, with the exception of a small space all around the inside of the casing, which acts as a conduit for the air and gas mixture when the device is in use. This space is very small with relation to the size of the casing, and the air and gas mixture flowing over the distributer B between the said distributer and the casing will be very evenly distributed to the burner holes in the casing.

The distributer B is preferably formed hollow with a lower plate $e$ which acts as a deflector, and is bolted to the base plate A by a screw bolt that preferably passes through the base plate and couples thereto the supply pipe or mixing chamber C. The parts are all kept firmly in proper position by bolts $g$ passing through the base plate and upward through the distributer and through the top plate $h$ of the uppermost cap.

To allow free ingress of the gas and air mixture, as well as to bring the two walls of the stove in proper proximity for efficient distribution, the distributer is elevated above the base plate or floor of the casing by any suitable means, such as by blocks resting upon the base plate or cast thereon, or by cups or indentations $i$ formed in the base plate. The gas is supplied to the stove by means of the pipe S, and passes to the mixing chamber C where it is mixed with air; the air entering through the interstices of the wire gauze M placed over the open end of the mixing chamber C. The mixture then passes to the burner, where it is distributed by the distributer B in a narrow sheet to the burner holes, whence it issues and is burned in the usual manner. By this arrangement of distributer, and surrounding casing or mantle, the mixture can be ignited, first, directly above the base plate and again at the center and upper portion of the structure; while, if it were not for the central distributer, the mixture could only be lighted at the top. It will thus be seen that by the distributing central block or chamber, I am enabled to realize not only a greater number of flames, but the metal of the structure becomes heated by the lower series of flames (which would not occur if all the flames were on top), and the structure becomes a heat retaining, as well as a heat distributing device, thus giving an increased efficiency. In order to embellish the appearance of the luminated structure, the casing or mantle $c$ $c$ $c$ may be covered with asbestos or other refractory material.

While I have shown a pyramidal form of burner, I would have it understood that I may employ a burner of conical or frusto conical form.

I do not limit myself to the specific construction and arrangement shown as it is obvious that the construction and arrangement may be greatly varied without departing from the spirit of my invention which is essentially to construct a burner consisting of a central conical or pyramidal distributing block or chamber with a sectional perforated casing closely surrounding the same and conforming in shape thereto.

Having described my invention, what I claim, and desire to secure by Letters Patent, is—

1. In a gas stove, the combination of a base-plate A perforated for the reception of the inlet pipe, a block or chamber B of pyramidal form supported over the base-plate with an air-space between the lower horizontal wall of the chamber and the base-plate, a casing surrounding the chamber and conforming in shape thereto and forming the burner proper, the same being composed of superposed caps $c\ c\ c$ having edge perforations $d$, an inlet pipe for the air and gas mixture communicating with the casing through the perforation in the base-plate, substantially as described.

2. In a gas stove, the combination with a perforated base-plate A, of a central pyramid consisting of a deflector plate E and a distributer B, the said deflecting plate being supported above the base-plate with an air-space between the deflecting plate and the base-plate, a casing consisting of tiers of caps $c\ c\ c$ having edge perforations $d$, the said casing closely surrounding the distributer B and conforming in shape thereto, bolts G for fastening the parts together, together with an inlet pipe communicating with the casing through the aperture in the base-plate, whereby the gas is uniformly distributed to the burner holes in the casing, substantially as described.

ABNER B. HUTCHINS.

Witnesses:
GEO. E. MORSE,
HARRY M. TURK.